United States Patent [19]

Schucker et al.

[11] 4,411,772
[45] Oct. 25, 1983

[54] FLUID COKING WITH THE ADDITION OF PEROVSKITE-CONTAINING CATALYSTS

[75] Inventors: Robert C. Schucker; Kenneth S. Wheelock, both of Baton Rouge, La.

[73] Assignee: Exxon Research and Engineering Co., Florham Park, N.J.

[21] Appl. No.: 351,968

[22] Filed: Feb. 24, 1982

[51] Int. Cl.³ ............... C10G 11/02; C10G 47/02
[52] U.S. Cl. ............................ 208/121; 208/112
[58] Field of Search ..................... 208/121, 112

[56] References Cited

U.S. PATENT DOCUMENTS

| | | | |
|---|---|---|---|
| 3,707,462 | 12/1972 | Moss | 208/127 |
| 4,055,513 | 10/1977 | Wheelock | 252/462 |
| 4,102,777 | 7/1978 | Wheelock | 208/121 |
| 4,179,409 | 12/1979 | Gladrow et al. | 208/120 |
| 4,208,269 | 6/1980 | Gladrow et al. | 208/120 |
| 4,269,696 | 5/1981 | Metrailer | 208/120 |

Primary Examiner—Delbert E. Gantz
Assistant Examiner—O. Chaudhuri
Attorney, Agent, or Firm—Marthe L. Gibbons

[57] ABSTRACT

A fluid coking process is provided in which a catalyst comprising a perovskite comprising at least one transition metal cation is present in the fluid coking zone.

8 Claims, 1 Drawing Figure

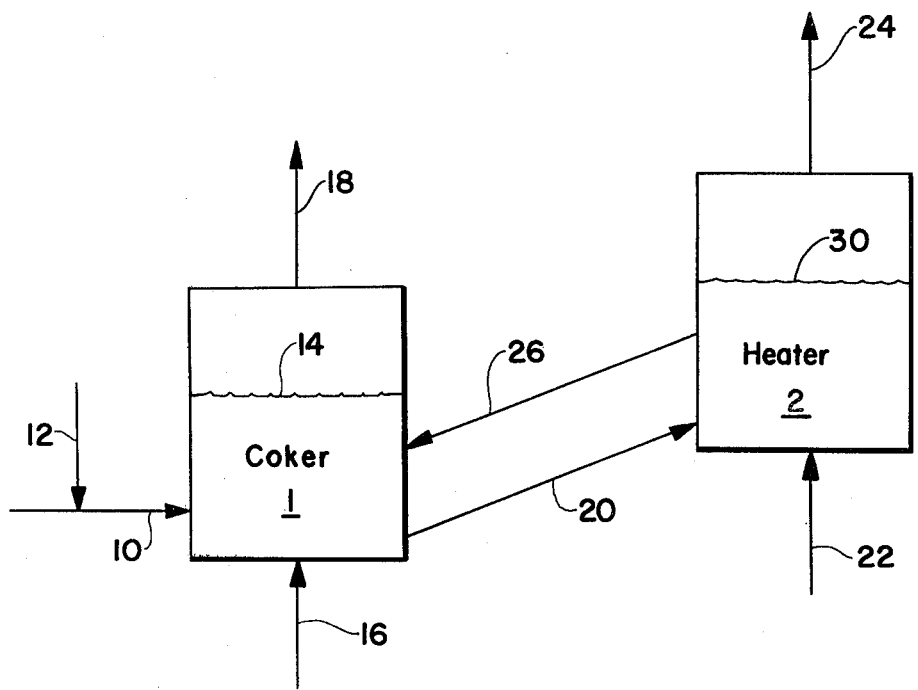

FLUID COKING WITH THE ADDITION OF PEROVSKITE-CONTAINING CATALYSTS

BACKGROUND OF THE INVENTION

1. Field of the Invention

This invention relates to an improvement in a fluid coking process. More particularly, this invention relates to fluid coking process conducted in the presence of a perovskite-containing catalyst.

2. Description of the Prior Art

Fluid coking is a well known process which may be carried out with or without recycle of the heavier portion of the fluid coking zone effluent. As is well known in the art, the fluid coking process, as shown for example, in U.S. Pat. No. 2,881,130, which is hereby incorporated by reference, uses a fluid coking vessel and an external heating vessel. A fluid bed of solids, preferably coke particles produced by the process having a size in the range from about 40 to about 1000 microns is maintained in the coking zone by the upward passage of fluidizing gas, usually steam, injected at a superficial velocity usually between 0.3 and 5 feet per second. The temperature in the fluid coking bed is maintained in the range of about 850 to about 1400° F., preferably between 900 and 1200° F. by circulating solids (coke) to the heating vessel and back. The heavy oil to be converted is injected into the fluid bed and upon contact with the hot solids undergoes pyrolysis evolving lighter hydrocarbon products in vapor phase, including normally liquid hydrocarbons, and depositing a carbonaceous residue (coke) on the solids. The turbulence of the fluid bed normally results in substantially isothermal reaction conditions and thorough and rapid distribution of the heavy injected oil. The feed rate and temperature are controlled to maintain the bed in a fluidized state. Product vapors, after removal of entrained solids, are withdrawn overhead from the coking zone and sent to a scrubber and fractionator for cooling and separation. The end boiling point of distillate fractions obtained from the process is usually about 1050° F. to about 1200° F. and the remaining heavy ends are usually recycled to extinction.

U.S. Pat. No. 4,269,696 discloses an integrated fluid coking and gasification process in which a solid cracking catalyst is added to the coker chargestock.

U.S. Pat. No. 4,208,269 and U.S. Pat. No. 4,179,409 discloses perovskite catalysts and their use in hydrocarbon conversion processes.

U.S. Pat. No. 4,055,513 and 4,102,777 disclose high surface area perovskite catalysts and their use in hydrocarbon conversion processes.

U.S. Pat. No. 3,707,452 discloses a fluid coking process in which calcium oxide or a precursor thereof is present in the fluidized bed coking zone.

U.S. Pat. No. 4,229,283 discloses fluid hydrocoking with the addition of dispersible metal compounds in the coker feed. Metallic ashes recovered from the gasification of the coke are recycled to the coker feed.

It has now been found that the presence of a perovskite-containing catalyst in the fluid coking zone will permit conducting the fluid coking reaction at a lower temperature at a constant feed rate or will permit an increase in feed rate at a constant temperature.

SUMMARY OF THE INVENTION

In accordance with the invention there is provided, in a fluid coking process comprising the steps of: contacting a carbonaceous chargestock with hot fluidized solids in a fluidized coking bed contained in a fluid coking zone maintained in a fluidized state by the introduction of a fluidizing gas and operated at coking conditions, to produce a vapor phase product and a solid carbonaceous material which deposits on said fluidized solids, the improvement which comprises the presence of a catalyst in said coking zone, said catalyst comprising an effective amount of a perovskite having at least one transition metal cation selected from the group consisting of elements having atomic numbers ranging from 21 through 30, from 39 through 48, from 57 through 80 and from 89 through 92.

The term "perovskite" is intended herein to designate metal oxides having the ideal and nonideal perovskite type crystalline structure. The ideal perovskite cyrstalline structure is defined by the empirical formula $ABO_3$ in which A and B are cations of two different metals and in which the A cation is coordinated to 12 oxygen atoms while the B cation occupies octahedral sites and is coordinated to 6 oxygen atoms. The ideal perovskite structure is cubic; however, few compounds have this ideal structure. A more complete description of the perovskite type structure can be found in *Structural Inorganic Chemistry*, A. F. Wells, Third Edition, Oxford, The Clarendon Press, 1962, pages 494–499. In general, the algebraic sum of the ionic charges of the two or more metals (cations) of the perovskite equals 6.

BRIEF DESCRIPTION OF THE DRAWING

The FIGURE is a schematic flow plan of one embodiment of the invention.

DESCRIPTION OF THE PREFERRED EMBODIMENT

Referring to the FIGURE, a carbonaceous chargestock having a Conradson carbon content of about 15 weight percent such as heavy residuum having an atmospheric pressure boiling point of about 1050° F.+, is passed by line 10 into a coking zone 1 in which is maintained a fluidized bed of solids (e.g. coke particles of 40 to 1000 microns in size) having an upper level indicated at 14. The fluidized bed of solids in the coking zone comprises a catalyst comprising a perovskite having at least one transition metal cation. The term "transition metal" is intended herein to designate elements having atomic numbers ranging from 21 through 30, from 39 through 48, from 57 through 80, and from 89 through 92. Preferably, the perovskite additionally comprises an alkaline earth metal cation selected from the group consisting of beryllium, magnesium, calcium, strontium, barium and mixtures thereof. More preferably, the perovskites are barium zirconate, and barium hafnate. Most preferably, the perovskite is barium zirconate. The perovskite may be a single perovskite or a mixture of perovskites. The perovskite may be present in the catalyst in an amount ranging from about 0.1 to 100 weight percent. Thus, the catalyst may be an unsupported perovskite, that is, 100% perovskite or the perovskite may be a composite catalyst. The composite catalyst may include supports which may be chosen from a wide variety of conventional supports, such as, silica, alumina, silica-alumina, silica-zirconia, other inorganic oxides, carbon, etc. Examples of certain high surface area supported perovskites are gien in U.S. Pat. No. 4,055,513, the teachings of which are hereby incorporated by reference. The catalyst is suitably present in the fluid coking zone in an amount such as to provide a weight ratio of catalyst to carbonaceous feed ranging from about 0.1:1 to about 1:1.

Suitable carbonaceous chargestock for the fluid coking stage of the present invention include heavy hydrocarbonaceous oils; heavy and reduced petroleum crudes; petroleum atmospheric distillation bottoms; petroleum vacuum distillation bottoms; pitch; asphalt; bitumem; other heavy hydrocarbon residues; tarsand oil; shale oil; liquid products derived from coal liquefaction processes, including coal liquefaction bottoms; coal; coal slurries, and mixtures thereof. Typically such feeds have a Conradson carbon residue of at least 5 weight percent, generally from about 5 to about 50 weight percent, preferably above about 7 weight percent (as to Conradson carbon residue, see ASTM Test D 189–65).

In the preferred embodiment, the perovskite-containing catalyst is added to the carbonaceous chargestock by line 12, although the catalyst may be introduced directly into the coking zone or indirectly into the coking zone via solids or fines that are recycled to the coker. Returning to line 12, the catalyst is added to the charagestock in an amount ranging from 0.1 to about 10 weight percent, preferably from about 1 to about 10 weight percent based on the initial coker chargestock, although the equilibrium level of catalyst in the coker may be higher than 10 weight percent based on carbonaceous feed. When the catalyst is an unsupported perovskite, if desired, the perovskite may be calcined prior to use at a temperature ranging from about 932° F. to 1832° F. (500° to about 1000° C.). The added catalyst particles are suitably below about 44 microns in diameter, preferably below about 20 microns in diameter, more preferably below about 5 microns in diameter.

A fluidizing gas is admitted to coker 1 by line 16 in an amount sufficient to maintain a superficial gas velocity in the range of about 0.3 to about 5 feet per second. The fluidizing gas may comprise steam, gaseous hydrocarbons, vaporized normally liquid hydrocarbons, hydrogen, hydrogen sulfide, and mixtures thereof. Typically, the fluidizing gas used will comprise steam. Coke at a temperature above the coking temperature, for example, at a temperature of 100 to 800 Fahrenheit degrees in excess of the actual operating temperature of the coking zone is admitted to coker 1 by line 26 in an amount sufficient to maintain the coking temperature in the range of about 850° to about 1400° F., preferably in the range of about 900° to about 1200° F. The total pressure in the coking zone is maintained in the range of about 0 to about 150 pounds per square inch gauge (psig), preferably in the range of about 5 to about 100 psig. The lower portion of the coker serves as a stripping zone to remove occluded hydrocarbons from the solids. The vaporous products include gaseous hydrocarbons and normally liquid hydrocarbons as well as other gases which were introduced into the coker as fluidizing gas. The vapor phase product is removed from coker 1 by line 18 for scrubbing and fractionation in a conventional way. If desired, at least a portion of the vaporous effluent may be recycled to the coker as fluidizing gas. A stream of heavy material condensed from the vaporous coker effluent may be recycled to the coker or the coker may be operated in a once-through manner, that is, without recycle of the heavy material to the coker.

A stream of stripped coke (commonly called cold coke) is withdrawn from the coker by line 20 and introduced into a fluid bed of hot coke having a level 30 in heater 2. The heater may be operated as a conventional coke burner such as disclosed in U.S. Pat. No. 2,881,130, which is hereby incorporated by reference. When the heater is operated as a burner, an oxygen-containing gas, typically air, is introduced into heater 2 by line 22. The combustion of a portion of the solid carbonaceous deposition on the solids with the oxygen-containing gas provides the heat required to heat the colder particles. The temperature in the heating zone (burning zone) is maintained in the range of about 1200° to about 1700° F. Alternatively, heater 2 can be operated as a heat exchange zone such as disclosed in U.S. Pat. Nos. 3,661,543; 3,702,516 and 3,759,676, the teachings of which are hereby incorporated by reference. Hot coke is removed from the fluidized bed in heater 2 and recycled to the coker by line 26 to supply heat thereto. If desired, the catalyst may be recovered from the heating zone or from the gasification zone of an integrated coking and gasification process and the recovered catalyst may be recycled to the coker chargestock or dilute phase of the coker, as described in U.S. Pat. No. 4,269,696, the teachings of which are hereby incorporated by reference.

The following example is presented to illustrate the invention.

EXAMPLE 1

Comparative experiments were made with a feed having an atmospheric pressure initial boiling point of about 565° C. and a Conradson carbon content of 26.8 weight percent. One experiment (A) was made without the addition of any catalyst. One experiment (B) was made with barium zirconate perovskite as the catalyst (run in accordance with the present invention) and one experiment (C) was made with a barium compound which was not a perovskite. The conditions and results of these experiments are summarized in Table I.

TABLE I

Arab Heavy Vacuum Residuum (IBP > 565° C.)
Conradson Carbon Residue - 26.8%
Reactor Temperature - 200–525° C. @ 10° C./minute
Catalyst/Oil (wt/wt) - 1
Pressure - 1 atmosphere

| | Rate of Volatilization (weight fraction/minute) Experiment | | |
|---|---|---|---|
| Temperature (°C.) | A Thermal | B BaZrO$_3$ | C BaCO$_3$ |
| 360 | 0.005 | 0.007 | 0.011 |
| 370 | 0.008 | 0.011 | 0.014 |
| 380 | 0.012 | 0.019 | 0.019 |
| 390 | 0.019 | 0.028 | 0.026 |
| 400 | 0.028 | 0.041 | 0.035 |
| 410 | 0.044 | 0.068 | 0.048 |
| 420 | 0.062 | 0.113 | 0.070 |
| 430 | 0.078 | 0.139 | 0.099 |
| 440 | 0.107 | 0.145 | 0.119 |

As can be seen from Table I, the addition of barium zirconate perovskite (Experiment B, in accordance with the present invention) provided an increased rate of volatilization. This would indicate that the same volatilization could be achieved at lower temperatures or that at the same temperature, the feed rate could be increased.

EXAMPLE 2

A second series of experiments was performed using selected metal oxides from Groups IIA and IVB. Experiments E, F, and G were experiments using metal oxides that were not perovskites. Experiment D was an experiment without any metal oxide. Experiment H as an experiment in accordance with the present invention using as catalyst a barium zirconate. The conditions and results of these experiments are summarized in Table II.

TABLE II

Arab Heavy Vacuum Residuum (IBP > 565° C.)
Conradson Carbon Residue - 26.8%
Reactor Temperature - 200-525° C. @ 10° C./minute
Catalyst/Oil (wt/wt) - 1
Pressure - 1 atmosphere

| | Rate of Volatilization (weight fraction/minute) Experiment | | | | |
|---|---|---|---|---|---|
| Temperature (°C.) | D Thermal | E CaO | F BaO | G $ZrO_2$ | H $BaZrO_3$ |
| 360 | 0.005 | 0.004 | 0.008 | 0.004 | 0.007 |
| 370 | 0.008 | 0.007 | 0.015 | 0.008 | 0.011 |
| 380 | 0.012 | 0.013 | 0.025 | 0.016 | 0.019 |
| 390 | 0.019 | 0.018 | 0.043 | 0.024 | 0.028 |
| 400 | 0.028 | 0.027 | 0.057 | 0.031 | 0.041 |
| 410 | 0.044 | 0.041 | 0.069 | 0.046 | 0.068 |
| 420 | 0.062 | 0.058 | 0.084 | 0.059 | 0.113 |
| 430 | 0.078 | 0.078 | 0.104 | 0.081 | 0.139 |
| 440 | 0.107 | 0.107 | 0.110 | 0.105 | 0.145 |

As can be seen from the data in Table II, the alkaline earth oxide, CaO, and $ZrO_2$ had no effect on the rate of cracking. Barium oxide increased the rate slightly. In contrast, experiment H, using barium zirconate perovskite, in accordance with the present invention, showed a substantial increase in the rate of volatilization.

EXAMPLE 3

A third series of experiments was performed in which $BaZrO_3$ perovskite was supported on a very low surface area support (alpha alumina). The results are shown in Table III.

TABLE III

Arab Heavy Vacuum Residuum (IBP > 565° C.)
Conradson Carbon Residue - 26.8%
Reactor Temperature - 200-525° C. @ 10° C./minute
Catalyst/Oil (wt/wt) - 1
Pressure - 1 atmosphere

| | Rate of Volatilization (weight fraction/minute) Experiment | |
|---|---|---|
| Temperature (°C.) | I Thermal | J 10% $BaZrO_3/\alpha\text{-}Al_2O_3$ |
| 360 | 0.005 | 0.009 |
| 370 | 0.008 | 0.014 |
| 380 | 0.012 | 0.025 |
| 390 | 0.019 | 0.034 |
| 400 | 0.028 | 0.044 |
| 410 | 0.044 | 0.060 |
| 420 | 0.062 | 0.079 |
| 430 | 0.078 | 0.103 |
| 440 | 0.107 | 0.119 |

Experiment J was an experiment in accordance with the present invention.

As can be seen, the supported $BaZrO_3$ catalyst increased the rate of volatilization, even though the increase was smaller than that obtained with the unsupported perovskite catalyst.

EXAMPLE 4

Experiments were also performed with other transition metal-containing perovskites and the results of several of these runs are shown in Table IV.

TABLE IV

Arab Heavy Vacuum Residuum (IBP > 565° C.)
Conradson Carbon Residue - 26.8%
Reactor Temperature - 200-525° C. @ 10° C./minute
Catalyst/Oil (wt/wt) - 1
Pressure - 1 atmosphere

| | Rate of Volatilization (weight fraction/minute) Experiment | | | | |
|---|---|---|---|---|---|
| Temperature (°C.) | K Thermal | L $LaCoO_3$ | M $CaVO_3$ | N $KNbO_3$ | O $LaAlO_3/Al_2O_3$* |
| 360 | 0.005 | 0.009 | 0.009 | 0.011 | 0.008 |
| 370 | 0.008 | 0.015 | 0.015 | 0.019 | 0.008 |
| 380 | 0.012 | 0.022 | 0.023 | 0.028 | 0.012 |
| 390 | 0.019 | 0.037 | 0.031 | 0.048 | 0.020 |
| 400 | 0.028 | 0.051 | 0.042 | 0.068 | 0.031 |
| 410 | 0.044 | 0.070 | 0.061 | 0.100 | 0.044 |
| 420 | 0.062 | 0.089 | 0.084 | 0.115 | 0.061 |
| 430 | 0.078 | 0.108 | 0.102 | 0.120 | 0.087 |
| 440 | 0.107 | 0.119 | 0.121 | 0.107 | 0.115 |

*Spinel passivated $\gamma\text{-}Al_2O_3$ in accordance with U.S. Pat. No. 4,055,513.

Experiments L, M, N, and O were experiments in accordance with the present invention. Experiment K was a thermal experiment in which neither metal oxide nor catalyst was utilized.

What is claimed is:

1. In a fluid coking process comprising the steps of: contacting a carbonaceous chargestock having a Conradson carbon content of at least about 5 weight percent with hot fluidized solids in a fluidized coking bed contained in a coking zone maintained in a fluidized state by the introduction of a fluidizing gas and operated at coking conditions, including a temperature ranging from about 850° to about 1,400° F., to produce a vapor phase product and a solid carbonaceous material which deposits on said fluidized solids, the improvement which comprises the presence of a cracking catalyst in said cooking zone in a weight ratio of said catalyst to said carbonaceous feed ranging from about 0.1:1 to about 1:1, said cracking catalyst comprising a perovskite having at least one transition metal cation selected from the group consisting of elements having atomic numbers ranging from 21 through 30, from 39 through 48, from 57 through 80 and from 89 through 92.

2. The process of claim 1 wherein said perovskite additionally comprises an alkaline earth metal cation selected from the group consisting of beryllium, magnesium, calcium, strontium, barium and mixtures thereof.

3. The process of claim 1 wherein said perovskite is selected from the group consisting of barium zirconate, barium hafnate and mixtures thereof.

4. The process of claim 1 wherein said catalyst is added to said chargestock in an amount ranging from about 0.1 to about 10 weight percent based on said chargestock.

5. The process of claim 1 wherein said perovskite is present in said catalyst in an amount ranging from about 0.1 to 100 weight percent.

6. The process of claim 1 wherein said catalyst has a particle size of less than about 44 microns in diameter.

7. The process of claim 1 wherein said coking conditions include a temperature ranging from about 900° to about 1200° F.

8. The process of claim 1 wherein said coking conditions include a pressure ranging from about 0 to about 150 psig.

* * * * *